United States Patent [19]
Barker et al.

[11] Patent Number: 5,228,924
[45] Date of Patent: Jul. 20, 1993

[54] PHOTOVOLTAIC PANEL SUPPORT ASSEMBLY

[75] Inventors: James M. Barker, Reading; John C. Underwood, Chelmsford, both of Mass.; Jefferson Shingleton, Auburn, N.Y.

[73] Assignee: Mobil Solar Energy Corporation, Billerica, Mass.

[21] Appl. No.: 787,538

[22] Filed: Nov. 4, 1991

[51] Int. Cl.⁵ ......................................... H01L 31/042
[52] U.S. Cl. .................................................... 136/246
[58] Field of Search ................. 136/246; 126/424–425

[56] References Cited

U.S. PATENT DOCUMENTS

| | | | |
|---|---|---|---|
| 4,004,574 | 1/1977 | Barr | 126/424 |
| 4,108,154 | 8/1922 | Nelson | 126/425 |
| 4,137,897 | 2/1979 | Moore | 126/424 |
| 4,149,523 | 4/1979 | Marcotte et al. | 126/422 |
| 4,154,221 | 5/1979 | Nelson | 126/425 |
| 4,223,214 | 9/1980 | Dorian et al. | 250/203 |
| 4,429,178 | 1/1984 | Prideaux et al. | 136/246 |
| 4,611,090 | 9/1986 | Catella et al. | 136/251 |
| 4,649,899 | 3/1987 | Moore | 126/425 |
| 4,966,631 | 10/1990 | Matlin et al. | 136/244 |

FOREIGN PATENT DOCUMENTS

85G1450DE of 1985 Fed. Rep. of Germany ...... 136/246

OTHER PUBLICATIONS

Solarex Corp., Rockville, Md., Product Brochure, 1979.

Primary Examiner—Aaron Weisstuch
Attorney, Agent, or Firm—Pandiscio & Pandiscio

[57] ABSTRACT

A solar energy power source is provided comprising at least two flat photovoltaic panels disposed in co-planar side-by-side relation and an improved support structure for supporting the panels for pivotal movement on a pivot axis that extends transversely of the panels, the improved structure including a single selectively operable drive means for pivoting all of the panels simultaneously and by the same amount of angular displacement.

2 Claims, 4 Drawing Sheets

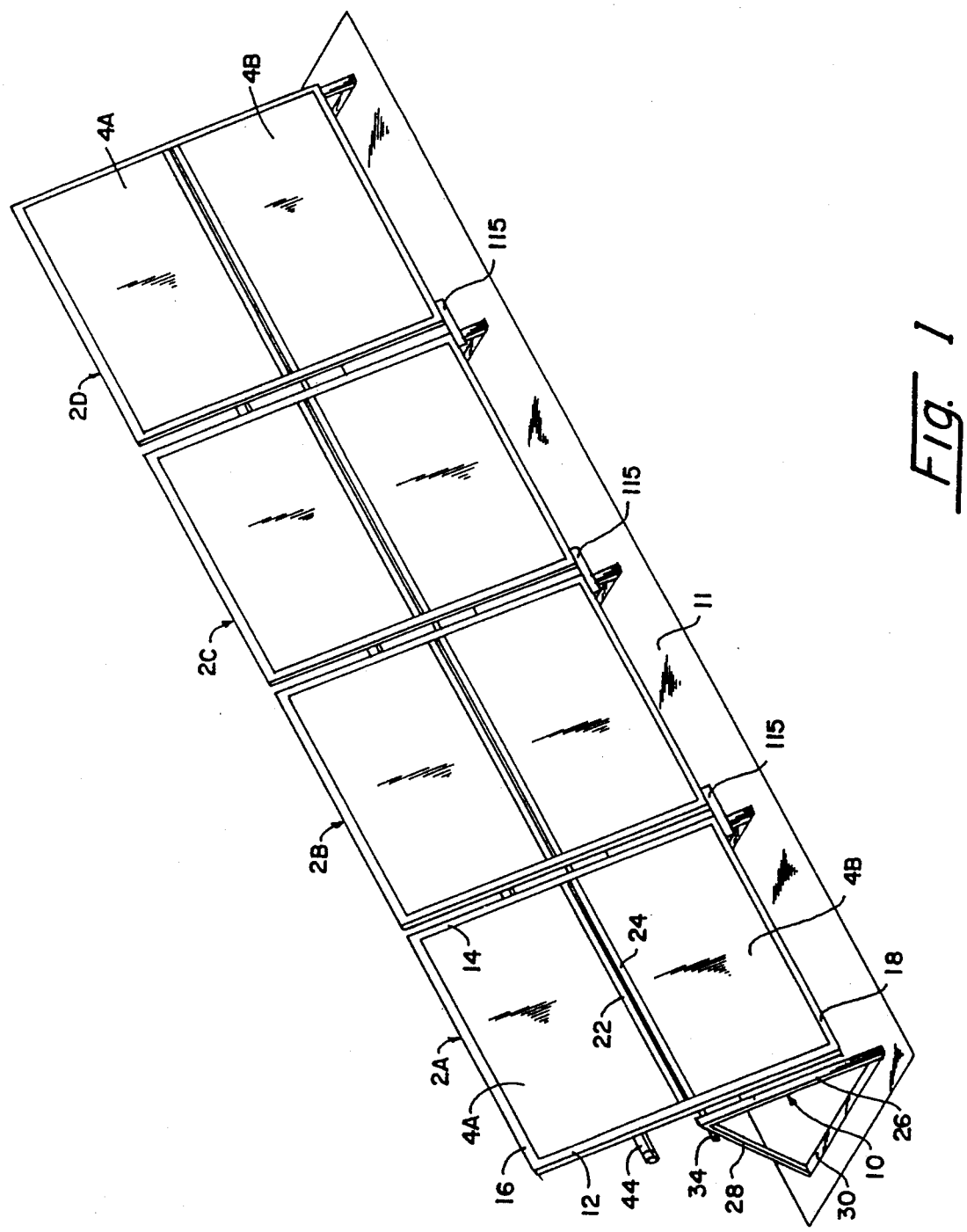

PHOTOVOLTAIC PANEL SUPPORT ASSEMBLY

This invention relates to solar energy collection systems utilizing a multiplicity of photovoltaic ("PV") cells to generate electrical power from incident solar radiation, and more particularly to an improved solar tracker designed to move and stably position a unified array of photovoltaic modules in relation to the sun.

BACKGROUND OF THE INVENTION

Prior practice has been to combine a plurality of photovoltaic solar cells into a flat rectangular module of selected size, and then form a flat array consisting of a plurality of such modules. By way of example, one suggested prior art technique involves assembling a plurality of solar cells so as to form rectangular modules measuring approximately 1'×4', with each module being surrounded and supported at its edges by a rigid frame made of a suitable material, e.g., aluminum. These modules are intended to be mounted in a rigid grid-like (i.e., trellis-like) framework forming part of a pivotal support structure, with the grid-like framework having a plurality of openings each sized and adapted to accommodate a single module in a nesting relationship. The several modules are electrically connected in parallel or in series, according to the power output requirements of the operator. Another arrangement consists of mechanically and electrically connecting two or more modules as an integrated structure, which structure is frequently referred to as a "solar panel". These panels in turn are mounted on a pivotal support structure.

According to efficient practice, the pivotal support structure is oriented so as to cause the modules or panels to face the sun. To maximize the concentration of incident solar energy, efforts have been made to provide a suitable support structure adapted to adjust the orientation of the panels to accommodate for variations in the angle of the sun during various seasons of the year and during each day of a given season, i.e., solar tracking means.

Photovoltaic solar modules and panels mounted in ground or roof installations catch and are stressed by the wind. The buffeting effect by winds of even modest velocity, e.g., 10 miles per hour, places the panels and their supporting structure under relatively high stress. As an economy measure, particularly where two or more panels are mounted in tandem on the same support structure, it is common to orient the pivotable support structure so that the panels extend north to south and to limit the panel-adjusting means to a single axis mode of operation whereby the panels can be pivoted east to west on a north/south pivot axis to compensate for variations in the angle of the sun from sunrise to sunset. Nevertheless, in the interest of withstanding high winds, the common practice has been to utilize relatively massive support structures, some with cross-braces that serve to provide panels with added deformation resistance as well as to connect them to the support structure. These relatively massive support structures are costly and cumbersome and constitute another factor tending to discourage widespread use of arrays of photovoltaic panels as economical sources of electrical power. Furthermore, they are especially objectionable from a cost standpoint when utilizing a plurality of relatively large silicon solar cell modules, e.g., modules that measure 4'×6'.

The primary object of this invention is to provide a photovoltaic solar energy collection and conversion system that is characterized by a simple, relatively inexpensive solar module support structure.

Another object is to provide a new and improved mechanical structure for pivotally mounting a plurality of photovoltaic modules and panels in a planar array that is unified so that a single mechanism may be used to simultaneously and correspondingly change the angle of declination of the array.

A more specific object is to provide a solar energy electrical power source comprising at least two flat photovoltaic panels disposed in co-planar side-by-side relation and an improved support structure for supporting the panels for pivotal movement on a pivot axis that extends transversely of the panels, the improved structure including selectively operable means for pivoting all of the panels simultaneously and by the same amount of angular displacement.

A further specific object is to provide a support mechanism for supporting and tracking multiple photovoltaic modules wherein individual structural members perform multiple tasks.

These and other objects and advantages of the invention are achieved by providing (1) at least two flat PV panels in side by side and co-planar relation, (2) a pivot shaft extending transversely of the side-by-side panels, (3) at least two supports spaced apart lengthwise of the shaft, (4) means for mounting the pivot shaft to the at least two supports, (5) means for connecting the panels to the pivot shaft so that the panels can pivot about the longitudinal axis of the shaft, (6) means for mechanically coupling all of the panels together so as to form a unified flat array, and (7) electro-mechanical drive means for (a) mechanically pivoting the unified array about the aforesaid axis and (b) locking the array against pivotal movement when the electro-mechanical drive means is deenergized.

Other objects, features and advantages are set forth in the following detailed description of a preferred embodiment of the invention which is to be considered together with the accompanying drawings.

BRIEF DESCRIPTION OF THE DRAWINGS

FIG. 1 is a front perspective view in elevation of a PV solar energy collection and conversion apparatus constituting a preferred embodiment of the invention;

Like numerals are used in the several figures to identify like components.

DESCRIPTION OF THE PREFERRED EMBODIMENT

Figure 6:
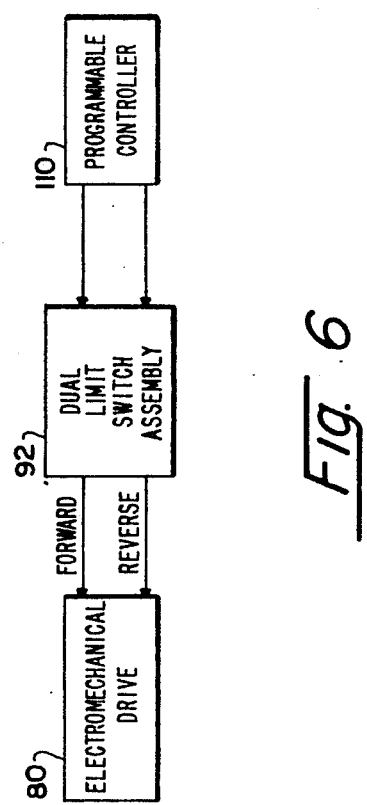
FIG. 6 is a diagramatic representation of a control system for the present invention.

Referring now to FIGS. 1-6, the illustrated apparatus comprises four dual-module (i.e., bi-module) photovoltaic ("PV") panels 2A-2D with the modules in each panel being identified as 4A and 4B. These modules are formed as described below. These PV panels 2A-2D are mounted on a support structure which comprises a plurality of A-frame support units 10 that are made of metal and are secured to a base 11 (FIG. 1) which preferably is a concrete slab on the ground or a flat roof. The A-frame units are preferably made of angle irons.

Each of the modules 4A and 4B consists of a plurality of silicon photovoltaic solar cells which are interconnected in series and/or in parallel so that each module has a predetermined voltage and current output.

Although not shown, it is to be understood that preferably, but not necessarily, each module 4A and 4B consists of a laminated structure which comprises in the order named: (1) a top (front) layer in the form of a pane (sheet) of glass, (2) a layer of "EVA", a transparent plastic adhesive consisting essentially of an ethylene vinyl acetate copolymer, (3) an array of silicon solar cells interconnected in series or in parallel according to the output voltage and current requirements, (4) a second layer of EVA, and (5) an insulating and water impermeable back skin or cover in the form of a layer of Tedlar. The latter is the trade name for a polyvinyl fluoride polymer made by DuPont.

In the preferred form of practicing the invention, each solar module is made up of a series of 4"×4" rectangular silicon solar cells which are initially arranged and electrically connected in series in strips of 18 cells each, and then 12 strips are arranged in side-by-side relation and connected in parallel to form 4'×6' modules, with each cell having a voltage output of about 0.5 volts and each module having a total voltage output of about 8.0 volts. In the lamination process (which involves heating) the layer of EVA is liquified enough to fill the voids between adjacent solar cells and form an integrated, unified structure.

Each of the panels 2A-2D consists of a pair of side rails or frame members 12 and 14, a pair of end frame members 16 and 18, and a pair of cross-members 22 and 24 that extend between the side frame members 12 and 14. The PV module 4A is encompassed and supported by the side frame members 12 and 14, the end frame member 16 and the crossbar member 22. The second module 4B in each panel is encompassed and supported by the side frame members 12 and 14, the end frame member 18, and the crossbar member 24. Preferably a small air gap exists between cross members 22 and 24 to allow air to pass between them and thus reduce the total "sail" effect.

Although not shown, it is to be understood that preferably, but not necessarily, each of the photovoltaic solar cells in modules 4A and 4B comprises a silicon substrate, a PN junction located within about 0.5 microns from the front surface of each cell, an AR (anti-reflection) coating on the front side of each cell, and ohmic contacts on the front and back sides of each cell, with the ohmic contact on the front side of each cell comprising a silver grid-shaped contact, while the ohmic contact on the rear side of each cell comprises either an uninterrupted aluminum layer or an aluminum layer having apertures in which are formed silver pads for facilitating soldering of the rear contacts. In each module the glass pane overlies the front AR-coated side of the assembled cells, while the back skin covers the rear contact. The back skin may be a sheet of glass or a plastic material. Preferably, the back skin is made of Tedlar as previously described. The back skin and the front pane are hermetically sealed to the solar cells by the EVA layers so that the four edges of the module and the front and rear surfaces of the solar cells are not exposed directly to atmospheric conditions. Although not shown, it is to be understood that each module has electrical terminals that are soldered to ribbon-like electrical conductors that are used to interconnect the modules to an exterior power take-off circuit.

Figure 2:
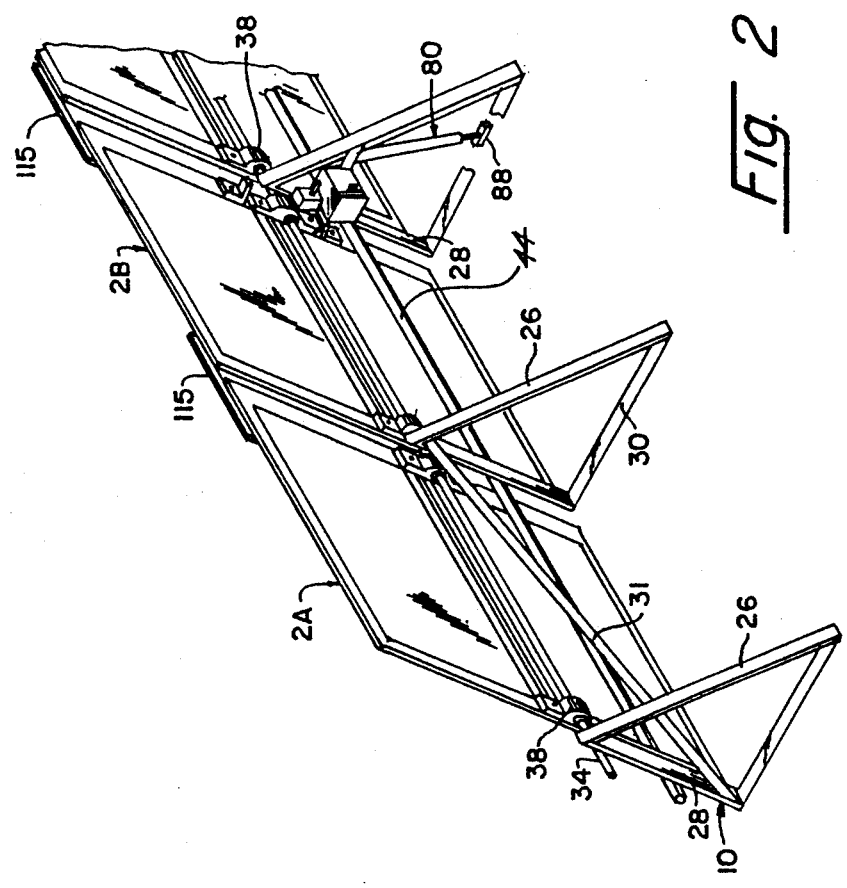
FIG. 2 is a front perspective view of the same apparatus with the panels pivoted to a different position.
Figure 3:
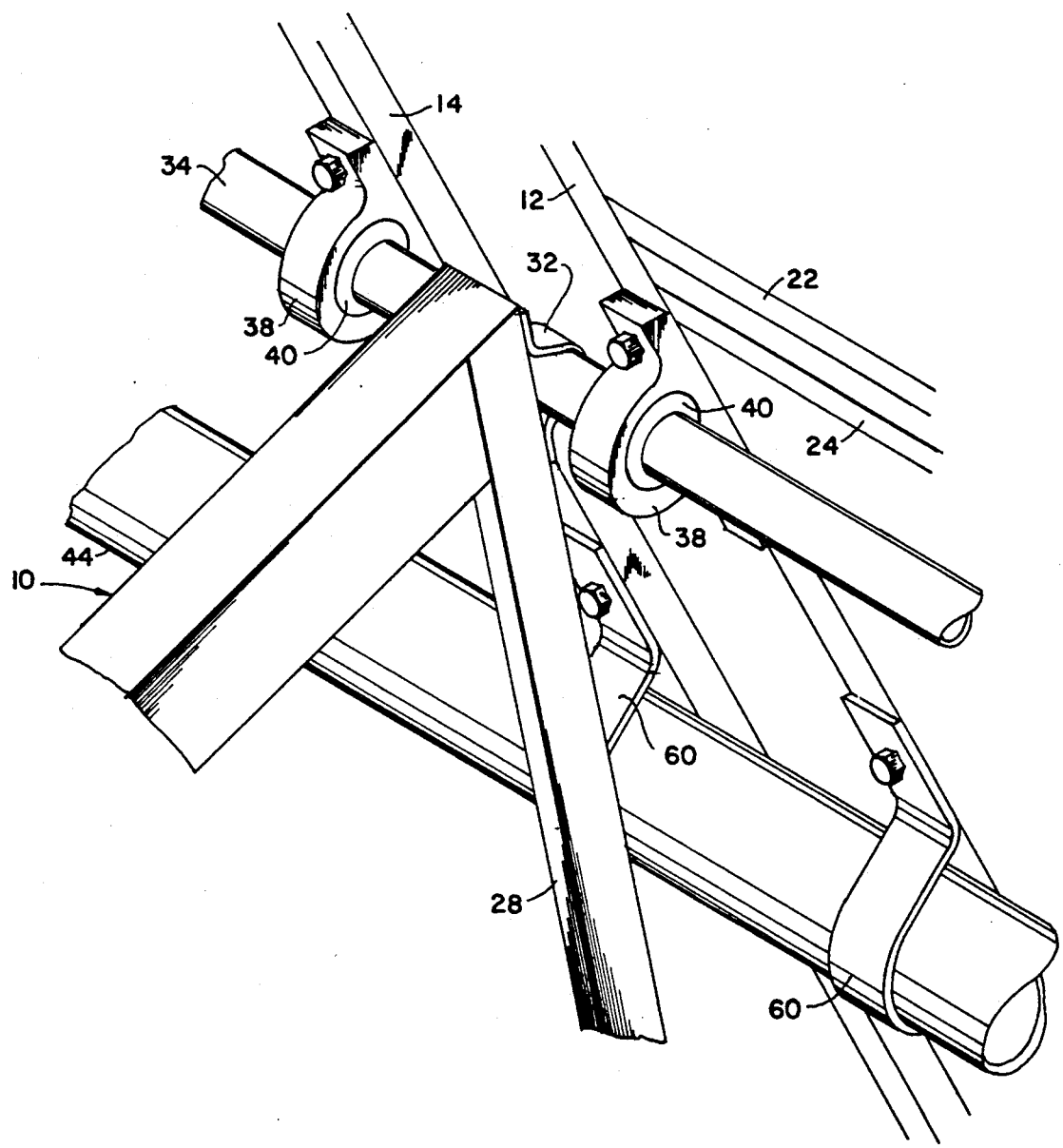
FIG. 3 is a fragmentary front perspective view on an enlarged scale of the same apparatus.
Figure 4:
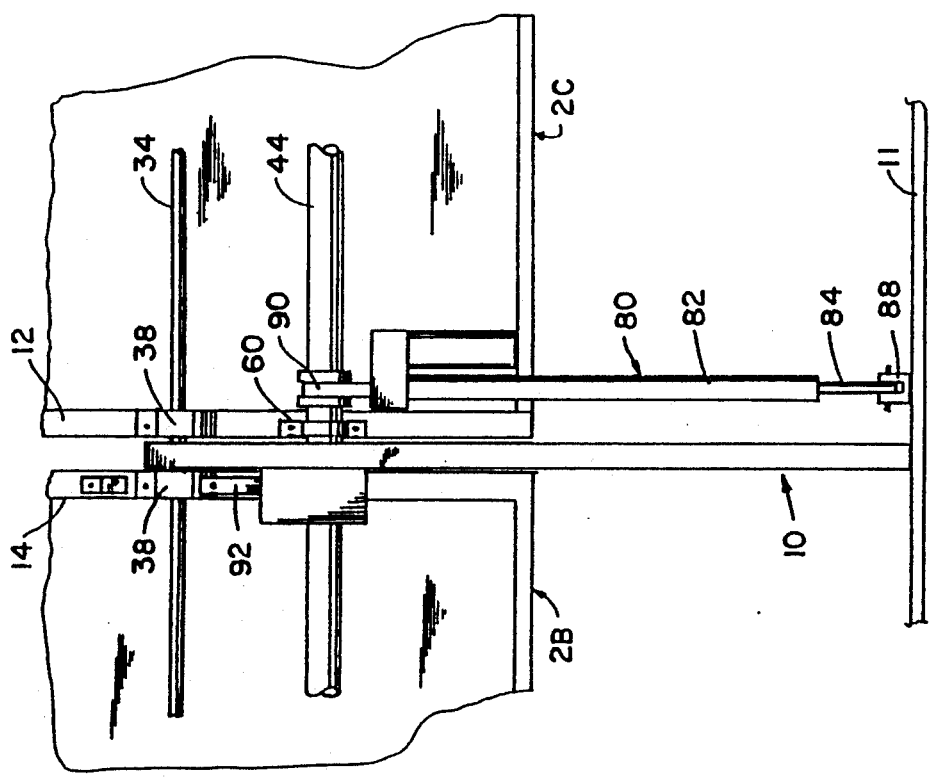
FIG. 4 is a fragmentary view in elevation showing the mechanism for pivoting the array of panels.

Turning now to FIGS. 2–4, the A-frame support units 10 preferably comprise front and rear angularly-disposed struts 26 and 28 that are welded or bolted together and also to a horizontally-disposed connecting member 30. The horizontally-extending brace or connecting member 30 is securely attached to base 11. A diagonal brace member 31 is provided which extends from the juncture of members 28 and 30 of one A-frame unit to the juncture of members 26 and 28 of an adjacent A-frame unit. This member distributes loads to the base. Diagonal braces 31 need not be used between each pair of A-frame units.

As seen best in FIG. 3, a U-shaped anchor member 32 is attached to the rear side of each A-frame support unit. The U-shaped anchor member embraces and serves to secure a pivot shaft 34 to each of the A-frame supports. For the purpose of illustrating that the number of panels 2A-2D is variable, the shaft 34 and also the coupling member 44 hereinafter described, are shown in FIGS. 1 and 2 as projecting beyond panel 2A.

Still referring to FIGS. 2-5, the several panels 2A-2D are pivotally secured to pivot shaft 34 by means of like U-shaped journal units 38 which are secured to the side frame members 12 and 14 of the panels and are provided with roller, ball or sleeve bearing units 40 (FIG. 5) that encompass pivot shaft 34. As a result of this arrangement, the several panels 2A-2D can rotate on pivot shaft 34.

The several panels 2A-2D are connected together to form a unified array by virtue of a force-applying elongate coupling member 44. The latter may take various forms, e.g., it may be a hollow pipe (as shown in the drawings) or a hollow or solid flat rod or bar. Preferably, coupling member 44 is in the form of a hollow pipe for reasons of cost. Member 44 is secured to each of the panels 2A-2D by means of U-shaped clamps 60 that are bolted to the side frame members 12 and 14 and are arranged so as to embrace and secure the member 44 to the several panels. The member 44 is rigid and, therefore, because of the connections made by the clamps 60, the several solar panels are connected so as to form a unified array.

Positioning of the array of solar panels 2A-2D is accomplished by means of an electro-mechanical drive means 80 that is reversible. The drive means 80 may take various forms and may, for example, be similar to the reversible drive means disclosed in U.S. Pat. No. 4,004,574. Preferably, however, the drive means 80 comprises a screw-type ELECTRAK linear actuator manufactured by the Warner Electric Division of Dana Corporation, located at 449 Gardner Street, South Beloit, Ill. 61080. Although details of its construction are not shown in the drawings, it is to be understood that the ELECTRAK actuator comprises an electric motor, a gear reduction unit driven by the motor, a brake, a clutch, two telescoping tubes 82 and 84 (FIG. 4), and a screw/nut mechanism coupling the two tubes with the screw being driven by the motor. When the motor is operated, the resulting rotation of the screw causes the two tubes to telescope in either a retracting or extending mode according to the direction of movement of the electric motor's drive shaft. The outer end of the inner telescoping tube of the ELECTRAK actuator is pivotally secured to a bracket 88 attached to the base 11. The other end of the ELECTRAK actuator is attached to a collar 90 that is rotatably mounted on the force-applying tube 44. When the motor (not shown) of the linear actuator 80 is operated in a first direction calculated to extend tube 84 relative to the tubular housing 82, the solar panel array comprising the panels 2A-2D will tend to pivot clockwise as viewed in FIG. 5. If operation of the motor is reversed so as to cause the tubes 82 and 84 to telescope in a contracting fashion, the array of solar cell panels will pivot in a counter-clockwise direction as viewed in FIG. 5.

Figure 5:
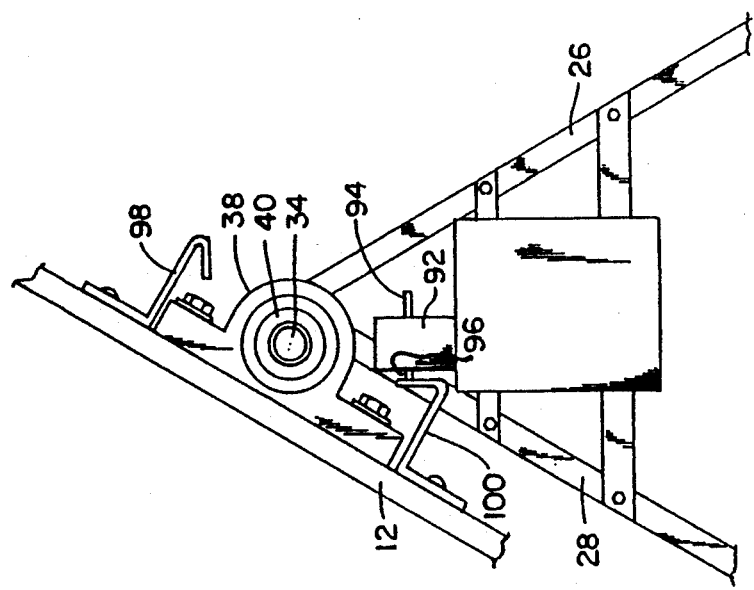
FIG. 5 is a fragmentary view in side elevation on an enlarged scale illustrating further details of the support structure, the same pivoting mechanism, and a motion-reversing switch unit.

Associated with the electro-mechanical drive system is a dual limit switch assembly which comprises a dual limit switch unit 92 characterized by first and second operating buttons 94 and 96. This dual switch assembly is mounted to one of the A-frame structures in position for the two buttons 94 and 96 to be operated by angular cam members 98 and 100 that are attached to one of the frame members 12 or 14. The cam members are arranged so that when the array of panels 2A-2D is pivoted in one direction (e.g., clockwise as seen in FIG. 5) by electro-mechanical actuator 80, cam member 98 will contact and depress button 94, thereby causing operation of the motor of the electro-mechanical actuator to reverse. Similarly, when the actuator rotates the panels in the opposite direction, pivotal movement of the array will reverse when cam member 100 engages and depresses the button 96.

As noted above, the invention is directed to providing a support structure for an array of solar cell panels so that the panels may be moved in synchronism with movement of the sun on a daily basis Thus, early in each day the electro-mechanical actuator 80 positions the solar panels so that they face east at a predetermined angle of inclination. As the sun traverses the sky from east to west, the electro-mechanical actuator is operated so as to cause the panels to rotate in synchronism with movement of the sun until the solar panels reach a predetermined limit angle relative to the setting sun. Assuming that the viewpoint of FIG. 5 is looking south to north, the movement of the solar cell panels in tracking the sun involves a counter-clockwise rotation as viewed in FIG. 5.

The dual limit switch assembly limits the angle of movement of the solar panel array. Typically, the cam members 98 and 100 are arranged so that when the solar panels are rotated clockwise to a first limit position determined by engagement of cam 98 with switch button 94, the panels will extend at an angle of approximately 130 degrees to the eastern horizon, and when the solar cell array is rotated counter-clockwise to a second limit position determined by engagement of cam member 100, with switch button 96, the solar cell array will be disposed at an angle of about 130 degrees to the western horizon.

Use of a screw-type electro-mechanical actuator for pivoting the solar panel array is advantageous in that, particularly when a screw-type actuator is used, the position of the solar panels relative to the sun may be changed in relatively small increments, while at the same time termination of operation of the electric motor that powers the actuator mechanism assures that the actuator will prevent movement of the solar panels under the effect of moderate wind buffeting.

FIG. 6 illustrates diagrammatically a control system for operating the electro-mechanical drive means so as to cause the solar cell panel array to track according to the daily position of the sun. In this control system, the electro-mechanical drive 80 is coupled to a clock-controlled programmable controller 110 that is adapted to initiate operation of the drive daily at a time predetermined according to the day of the year. The controller also is designed to reverse the drive means when its second limit switch button 96 is depressed, so as to cause the drive means to pivot the solar cell array back to a horizontal position to reduce wind loading at night, and then hold it in that position until the next day. The controller then initiates movement of the array to the original eastward-facing position, and then causes it to move as previously described in synchronism with movement of the sun. The controller may be a conventional electro-mechanical controller or it may be computer programmed to provide the desired operating sequence. The essential thing is that the controller is programmed so as to cause the electro-mechanical actuator 80 to initiate westward pivoting of the solar cell array incrementally in a stepwise or slow continuous mode so as to track movement of the sun from the eastern to the western horizon commencing at a predetermined time and ending when cam 98 engages limit switch button 96. Additionally, the controller is arranged so that when the solar panel array has been moved far enough to actuate the limit switch button 96, the motor of the electro-mechanical drive means will reverse its operation so as to cause the solar panel array to pivot clockwise back to its horizontal position. Once the solar panel array has been returned to its horizontal position, it will remain there until the controller initiates a subsequent eastward movement for the next consecutive day of solar panel tracking.

An essential advantage of the invention as described above is that various electro-mechanical means may be used for pivoting the array of solar cell panels. Additionally, by having the solar cell modules disposed in a simple, relatively small mass framework, the power required to rotate the solar cell array is reduced to practical limits. Also contributing to the lower power input is the fact that the pivot shaft 34 is offset from the geometric midpoint of the panels so as to moment balance the panels and thereby offset the weight of the coupling member. Furthermore, the simplified arrangement for mounting the several photovoltaic modules into a plurality of solar cell panels reduces the number of required structural members and offers the advantage that certain frame members perform dual tasks, e.g., the coupling member 44 adds rigidity to the dual module panels, couples all of the panels 4A-4D together, and acts to transmit forces from actuator 80 to panels 2A-2D. Similarly, the pivot shaft 34 serves to transmit horizontal forces to the diagonal braces 31. At the same time, the foregoing arrangement makes it possible to support the photovoltaic modules so as to minimize the "sail" effect. In this connection, it is to be noted that the gaps between adjacent panels and also between the two modules in each panel, have the effect of reducing the "sail" effort. Nevertheless, the framework is adequate to improve the resistance of the modules to distortion or fracture under wind-caused stress.

The electro-mechanical actuator, particularly one like the ELECTRAK linear actuator that is a screw-type electro-mechanical drive system, makes it possible to not only precisely position the solar cell array and to change its position at a relatively slow rate, but to also make certain that the position of the solar cell array at any given moment in time is substantially fixed, due to the fact that there is little or no backlash or play in the electro-mechanical drive system. In other words, electro-mechanical screw-type linear actuators not only provide precise selective positioning of the solar cell array, but they also have the advantage of positively locking the array in a particular position. In the usual case, the required rate of movement of the solar cell array in the course of tracking the sun from morning to evening, is quite small, averaging approximately 10 degrees per hour. Hence, an electro-mechanical linear actuator as above-described has the advantage of providing the required slow movement of the solar cell array while providing a braking action preventing movement of the solar cell array during the periods of moderate wind buffeting.

During periods of high winds, the actuator clutch is designed to slip. The actuator and the coupling member 44 are thereby protected from having to bear large loads. As a result, the actuator and coupling member can be formed out of lighter weight and lower strength components, which tend to be cheaper to produce. When the array is pivoted to the position shown in FIG. 2, excessive wind loads will cause the coupling member 44 to engage the A-frame members 28 so as to mechanically prevent further rotation of the solar panels. When the panels are in the position shown in FIG. 1, further rotation of the panels under wind loads is prevented by virtue of engagement of additional mechanical coupling straps 115 that interconnect adjacent panels, e.g., 2A and 2B, and are intercepted by the front A-frame members 26.

Other advantages of the invention will be obvious to persons skilled in the art.

It is to be appreciated that the invention is susceptible of various modifications. Thus, for example, the number of photovoltaic modules in a panel may be as little as one or may be in excess of two. Similarly, the number of panels mounted on the same pivotal axis may be greater or less than the four panels illustrated in the present drawings. Furthermore, the nature of construction of the solar cells and the solar modules, is not critical to the invention. Thus, for example, the solar cells may be made of some material other than silicon known to persons skilled in the art. The essence of the invention is that is provides a new and improved means for supporting a plurality of photovoltaic modules and panels for tracking purposes, with the electro-mechanical support and tracking structure being simple, reliable, and cheaper to construct than corresponding systems known to the prior art.

What is claimed is:

1. A solar energy electrical power source comprising in combination at least two flat photovoltaic panels disposed side-by-side in co-planar relation with one another, a pivot shaft extending transversely across the panels, at least two supports spaced apart lengthwise of the pivot shaft, means for connecting the pivot shaft to the at least two supports, attachment means for connecting the at least two panels to the pivot shaft so that the panels can pivot about the longitudinal axis of the shaft, coupling means mechanically coupling all of the panels together so as to form a unified flat array, and selectively operable drive means for mechanically pivoting the unified flat array about said axis;

wherein each of said flat photovoltaic panels comprises at least two modules each comprising a plurality of electrically interconnected photovoltaic cells, said at least two modules being aligned along a line extending at a right angle to said pivot shaft, and said coupling means comprises (a) an elongate member extending parallel to and spaced from said pivot shaft and (b) means for attaching said elongate member to said panels;

and further wherein each flat photovoltaic panel comprises a unitary frame consisting of a pair of end frame members extending parallel to said pivot shaft, a pair of side frame members extending between and connected to said end frame members, and a pair of spaced apart cross frame members, with one of said two modules being embraced by and secured to said side frame members and a first one of each of said end and cross frame members, and the other of said two modules being embraced by and secured to said side frame members and the second one of each of said end and cross frame members, whereby the gap created by said spaced apart cross frame members allow air to pass between them in order to reduce the "sail" effect when the solar array is subjected to buffeting winds.

2. Apparatus according to claim 1 wherein said drive means comprises an electrically-powered actuator that is capable of holding said array in a fixed angular position about said axis, and at least one dual limit switch means for said drive means mounted upon one of said supports and having a first and a second operation means arranged to cause reversal of the drive means, and cam means mounted upon one of said side frame members, which cam means will actuate one of said operating means upon a predetermined degree of positioning of said unitary frame.

* * * * *

UNITED STATES PATENT AND TRADEMARK OFFICE
CERTIFICATE OF CORRECTION

PATENT NO. : 5228924
DATED      : July 20, 1993
INVENTOR(S) : James M. Barker et al It is certified that error appears in the above-identified patent and that said Letters Patent is hereby corrected as shown below:

Claim 2, column 8, line 46, "operation" should be
-- operating --.

Signed and Sealed this

Twenty-second Day of February, 1994

Attest:

BRUCE LEHMAN

Attesting Officer

Commissioner of Patents and Trademarks